May 14, 1963  A. BRUEDER  3,089,558
LONGITUDINAL-ELASTICITY SUSPENSION SYSTEM
Filed Aug. 7, 1959  4 Sheets-Sheet 1

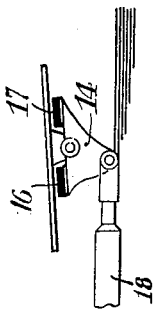
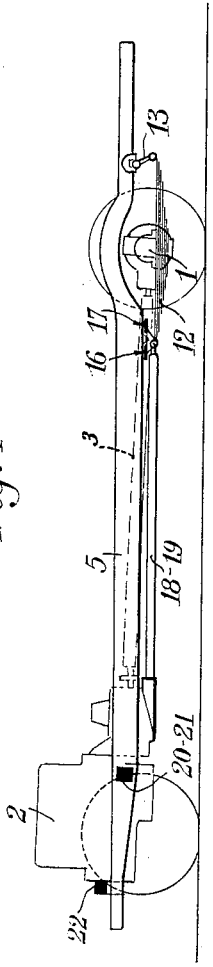
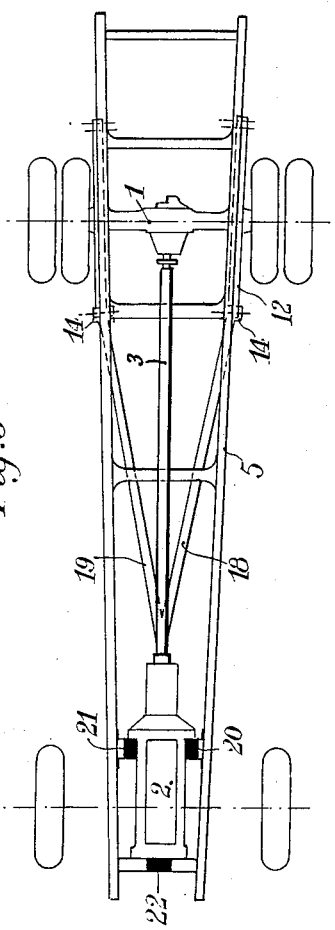

May 14, 1963  A. BRUEDER  3,089,558
LONGITUDINAL-ELASTICITY SUSPENSION SYSTEM
Filed Aug. 7, 1959  4 Sheets-Sheet 3
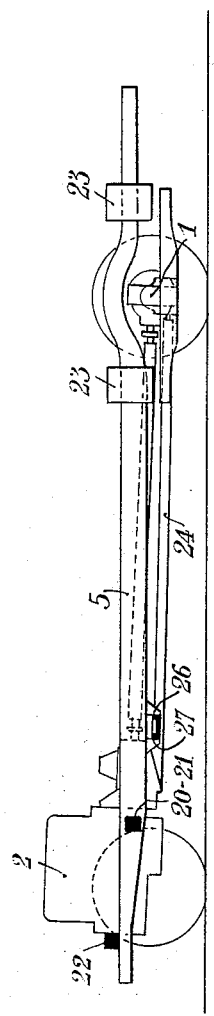
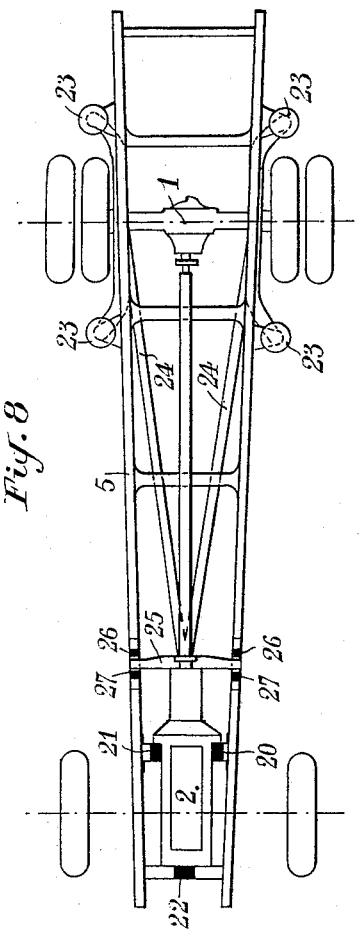

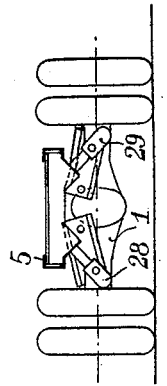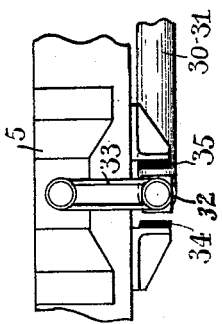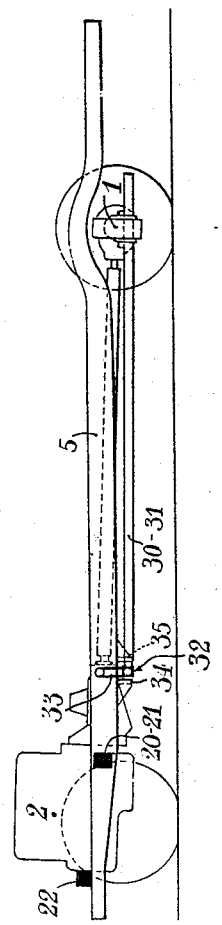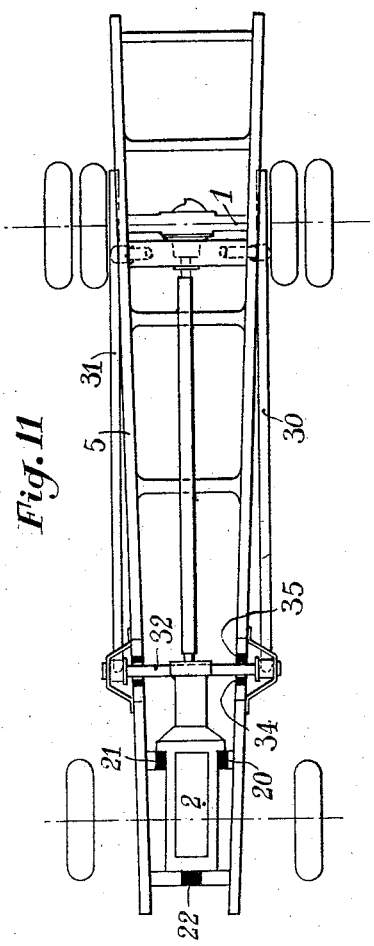

United States Patent Office 3,089,558
Patented May 14, 1963

3,089,558
LONGITUDINAL-ELASTICITY SUSPENSION SYSTEM
Antoine Brueder, Paris, France, assignor to Societe Anonyme Andre Citroen, Paris, France
Filed Aug. 7, 1959, Ser. No. 832,286
Claims priority, application France Sept. 8, 1958
1 Claim. (Cl. 180—64)

This invention relates to suspension systems of vehicles and has specific reference to an improved suspension system characterized by a longitudinal elasticity.

During the operation of a vehicle, the rolling engagement of the tires with the road surface and the road unevennesses are the sources of horizontal impulses which are transmitted to the frame of the vehicle.

On certain roads the unevennesses of the surface are frequently spaced at intervals having a regularity sufficient to cause the recurring shocks to produce a humming or like noise which is extremely unpleasant to the passengers.

Consequently, various attempts have been made with a view to provide a mode of operation of the suspension system such that these horizontal impulses are absorbed like the vertical impulses.

In principle, an elasticity may be sufficient to achieve the desired result, but, as in the vertical direction, period resonances may be encountered in the horizontal direction as well if the defect frequency corresponds to that of the suspension system.

Therefore, endeavours have been made with a view to provide a mechanical oscillating system adapted to act as a vibration absorber, and although a few solutions have already been proposed for passenger cars, none have so far proved successful for heavy or heavily loaded commercial vehicles, notably trucks and buses, wherein the driver's comfort is being regarded increasingly as a must.

It is the object of the present invention to provide a suspension system adapted to be mounted on commercial vehicles, which is characterized in that the assembly comprising the driving axle and the engine is utilized as a vibration-absorbing oscillating mechanical system; to this end, the driving axle and the engine are connected through completely or partially rigid means, the driving axle and the engine being resiliently but separately connected to the frame of the vehicle.

Thus, a mechanical system having a mass sufficient to absorb vibration is obtained while maintaining the weight of the sprung portion of the vehicle as low as possible.

The vertical elastic suspension of the engine is completed by an also elastic connection designed however for small horizontal displacements parallel to the longitudinal axis of the vehicle. This horizontal elastic connection is designed to absorb both the driving thrust and the braking reaction, and it will also absorb the impulses resulting from the rolling engagement of the tires with the road surfaces, as already explained hereinabove.

In order to afford a clearer understanding of the present invention and of the manner in which the same may be carried out in practice, reference will now be made to the accompanying drawings forming part of this specification and illustrating diagrammatically by way of example a few typical forms of embodiment of the invention. In the drawings:

FIGURES 4 and 5 are a side elevational view and a plan view from above, respectively, showing a vehicle frame equipped according to this invention.

FIGURE 6 is a side view of a detail shown in a larger scale.

FIGURES 7 and 8 are views similar to FIGS. 4 and 5 but illustrate a different form of embodiment of the invention.

FIGURE 9 is a cross-sectional view showing a detail on a larger scale.

FIGURES 10 to 12 are a side elevational view, a plan view from above and an end view from the rear, respectively, of a different form of embodiment; and FIGURE 13 is a detail thereof shown on a larger scale.

In the different figures of the drawings the same reference numerals and characters designate the same or similar parts.

Figure 1:
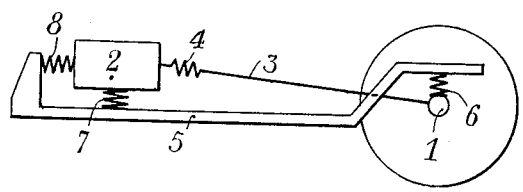
FIGURES 1 to 3 are side elevational views illustrating the application of the principle of this invention in three different mountings.

Referring first to the diagram of FIG. 1, the axle 1 is connected to the engine 2 through a rigid member 3 associated with resilient means 4. The frame 5 is supported by the axle 1 through the intermediary of resilient members 6 and the engine 2 is supported by the frame 5 through the medium of resilient members 7. Another resilient connection 8 is provided between the engine 2 and frame 5 to limit the horizontal movements of the engine.

Figure 2:
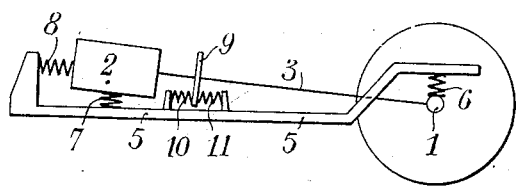

In the form of embodiment illustrated diagrammatically in FIG. 2 the rigid connecting member 3 disposed between the axle 1 and the engine 2 is solid with a rigid member 9 disposed between two resilient devices 10, 11 limiting the movements of the assembly comprising the engine 2 and axle 1 with respect to the frame 5; in this case, the longitudinal elastic connection 8 between the engine 2 and the frame 5 may be dispensed with, if desired.

Figure 3:
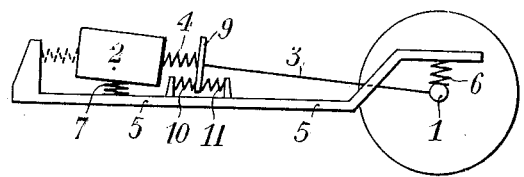

The same arrangement may be completed, as shown in FIG. 3, by a resilient connection 4 similar to the one shown in FIG. 1 which is interposed in the member 3 connecting the axle 1 to the engine 2.

In the embodiment of the invention illustrated in FIGS. 4 to 6, the vehicle frame 5 is supported by the axle 1 through the medium of leaf springs 12 having at the rear conventional shackles 13 and at the front different shackles 14 the oscillation of which is limited by elastic blocks 16, 17 acting like the elastic connecting members 10, 11 of FIG. 2, due to the provision of connecting bars 18, 19 whereby the engine 2 is rigidly coupled to said front shackles 14.

The engine 2 is carried by resilient blocks 20, 21 corresponding to the elastic supports 7 of the preceding diagrams, and by another resilient block 22 adapted to damp out the longitudinal oscillation of the engine 2 relative to the frame 5, this block 22 corresponding to the connection 8 of the preceding diagrams.

In the modified form of embodiment forming the subject-matter of FIGS. 7 to 9, the frame 5 is supported by the axle 1 through the medium of elastic suspension cylinders 23 and the axle 1 is rigidly connected through the coupling bars 24 to the cross member 25 of the frame; now this cross member 25 is rigid with the engine block and its longitudinal movements in relation to the frame 5 are limited on either side by a pair of resilient blocks 26 and 27 corresponding to the elastic connections 10, 11 of the diagram of FIG. 2; the engine block 2 itself is secured to the frame through the medium of resilient blocks 20, 21 and 22 as in the preceding case.

Referring now to the alternate form of embodiment shown in FIGS. 10 to 13, the rear suspension characterized by a high transverse stability comprises two hydropneumatic elements 28, 29 disposed obliquely and connecting the axle 1 to the frame 5; moreover, the axle is rigidly connected through connecting bars 30 and 31 to a cross member 32 rigid with the engine 2.

This cross member 32 has its front portion supported by hinged shackles 33 suspended from the upper portion of the frame 5, the longitudinal displacements of these shackles with respect to the frame being limited by the provision of resilient blocks 34 and 35, a certain play being provided, as in the preceding forms of embodiment, to permit the free movement of this cross member before it is stopped by the frame in one or the other direction for absorbing the driving thrust or the braking reaction.

The engine 2 is mounted on the frame as in the preceding cases with the interposition of resilient blocks 20, 21 and 22.

Of course, the forms of embodiment of the invention which are shown in the attached drawings and described hereinabove should not be construed as limiting the scope of the invention, for they merely constitute typical examples to which many modifications may be brought, notably with a view to comply with the specific type and arrangement of the suspension system provided on the vehicle, its arrangement and also with the frame and engine disposition.

What I claim is:

In a vehicle, the combination comprising a frame, a drive axle, drive wheels on said axle, leaf springs mounted on said axle and having ends to resiliently support said frame, shackle means having pivots on said frame and pivots on the ends of said leaf springs to connect said frame to the axle, an engine for rotatably driving said drive wheels, resilient means for supporting said engine on said frame while damping out the vertical oscillations of said engine on said frame, a rigid coupling member of substantially forked configuration having a forward end rigidly connected to said engine and opposite said forward end two rearward ends connected to the pivots on said springs of the forward shackle means and resilient pads carried by said forward shackle means and engageable with said chassis on either side of the pivots on the chassis of said forward shackle means to form an elastic longitudinal connection between the rigid coupling member and said chassis.

References Cited in the file of this patent

UNITED STATES PATENTS

| | | |
|---|---|---|
| 1,050,761 | Clark | Jan. 14, 1913 |
| 1,890,871 | Trott | Dec. 13, 1932 |
| 2,035,937 | Anderson | Mar. 31, 1936 |
| 2,081,965 | Trott | June 1, 1937 |
| 2,199,517 | Best | May 7, 1940 |
| 2,253,479 | Crosley et al. | Aug. 19, 1941 |
| 2,257,630 | Wahlberg et al. | Sept. 30, 1941 |
| 2,263,675 | Crosley | Nov. 25, 1941 |
| 2,716,461 | MacPherson | Aug. 30, 1955 |